(12) United States Patent
Sung et al.

(10) Patent No.: US 12,356,055 B1
(45) Date of Patent: Jul. 8, 2025

(54) CAMERA AND IMAGE TRANSMISSION METHOD

(71) Applicant: CREATIVE SENSOR INC., Taipei (TW)

(72) Inventors: Yu-Huan Sung, Taipei (TW); Shao-Yang Wu, Taipei (TW)

(73) Assignee: CREATIVE SENSOR INC., Taipei (TW)

( * ) Notice: Subject to any disclaimer, the term of this patent is extended or adjusted under 35 U.S.C. 154(b) by 65 days.

(21) Appl. No.: 18/405,927

(22) Filed: Jan. 5, 2024

(51) Int. Cl.
*H04N 23/23* (2023.01)
*H04N 23/84* (2023.01)

(52) U.S. Cl.
CPC ............. *H04N 23/23* (2023.01); *H04N 23/84* (2023.01)

(58) Field of Classification Search
CPC ............................... H04N 23/23; H04N 23/84
See application file for complete search history.

(56) References Cited

U.S. PATENT DOCUMENTS

| | | | |
|---|---|---|---|
| 2023/0040963 A1* | 2/2023 | Hansen | H04N 17/002 |
| 2023/0048503 A1* | 2/2023 | Elmfors | G01J 5/70 |

FOREIGN PATENT DOCUMENTS

| | | |
|---|---|---|
| KR | 1020220032847 A | 3/2022 |
| KR | 1020220053790 A | 5/2022 |

OTHER PUBLICATIONS

Office Action dated Nov. 22, 2024 of the corresponding Korean patent application No. 10-2023-0186614.
Office Action dated Jul. 22, 2024 of the corresponding German patent application No. 102024101739.2.

* cited by examiner

*Primary Examiner* — Kathleen V Nguyen
(74) *Attorney, Agent, or Firm* — Chun-Ming Shih; HDLS IPR SERVICES

(57) ABSTRACT

A camera includes an infrared thermal sensor, a processor, and an interface module is disclosed. The infrared thermal sensor is configured to generate an original sensing data. The processor is configured to process the original sensing data and generate an invisible light image whose pixel data size is one byte and multiple temperature data whose unit data size is two bytes. The interface module includes multiple transmission interfaces and is configured to transmit a heterogeneous image whose pixel data size is three bytes through one of the multiple transmission interfaces, where a bit-value of the three bytes is a linear combination of a bit-value of the one byte and a bit-value of the two bytes. The processor is configured to merge the invisible light image and the multiple temperature data according to an RGB color model channel to obtain the heterogeneous image of a visible light image format.

10 Claims, 8 Drawing Sheets

CAMERA AND IMAGE TRANSMISSION METHOD

BACKGROUND OF THE DISCLOSURE

Technical Field

The disclosure generally relates to a camera and a transmission method, and more particularly, to a camera for invisible light and an image transmission method.

Description of Related Art

The image types outputted by the camera are categorized into visible light images and invisible light images (also called "infrared thermal images") based on the types of sensors that the camera uses. The image format for the visible light images has been standardized, and technicians follow standard documents to process and transmit visible light images. However, the invisible light images do not have a standardized format. When a camera outputs invisible light images, technicians have no standard to follow for developing related functions.

Therefore, how to simplify the complexity of image processing and transmission under an environment that uses non-standard format images or data is the technical problem to be solved.

SUMMARY OF THE DISCLOSURE

The disclosure provides a camera including an infrared thermal sensor, a processor, and an interface module. The processor is connected to the infrared thermal sensor and the interface module. The infrared thermal sensor is configured to generate an original sensing data. The processor is configured to process the original sensing data and generate an invisible light image whose pixel data size is one byte and multiple temperature data whose unit data size is two bytes. The interface module includes multiple transmission interfaces and is configured to transmit a heterogeneous image whose pixel data size is three bytes through one of the multiple transmission interfaces, where a bit-value of the three bytes is a linear combination of the bit-value of the one byte and the bit-value of the two bytes. The processor is configured to merge the invisible light image and the multiple temperature data according to an RGB color model channel to obtain the heterogeneous image of a visible light image format.

One of the exemplary embodiments of the present disclosure is to provide an image transmission method for a camera, where the camera includes an infrared thermal sensor, a processor, and an interface module, and the processor is connected to the infrared thermal sensor and the interface module. The image transmission method includes steps of generating an original sensing data by the infrared thermal sensor; processing the original sensing data by the processor to generate an invisible light image whose pixel data size is one byte and multiple temperature data whose unit data size is two bytes; merging, by the processor, the invisible light image and the multiple temperature data according to an RGB color model channel to obtain a heterogeneous image of a visible light image format whose pixel data size is three bytes, where a bit-value of the three bytes is a linear combination of the bit-value of the one byte and the bit-value of the two bytes; and transmitting the heterogeneous image through one of multiple transmission interfaces of the interface module.

DETAILED DESCRIPTION

Figure 1:
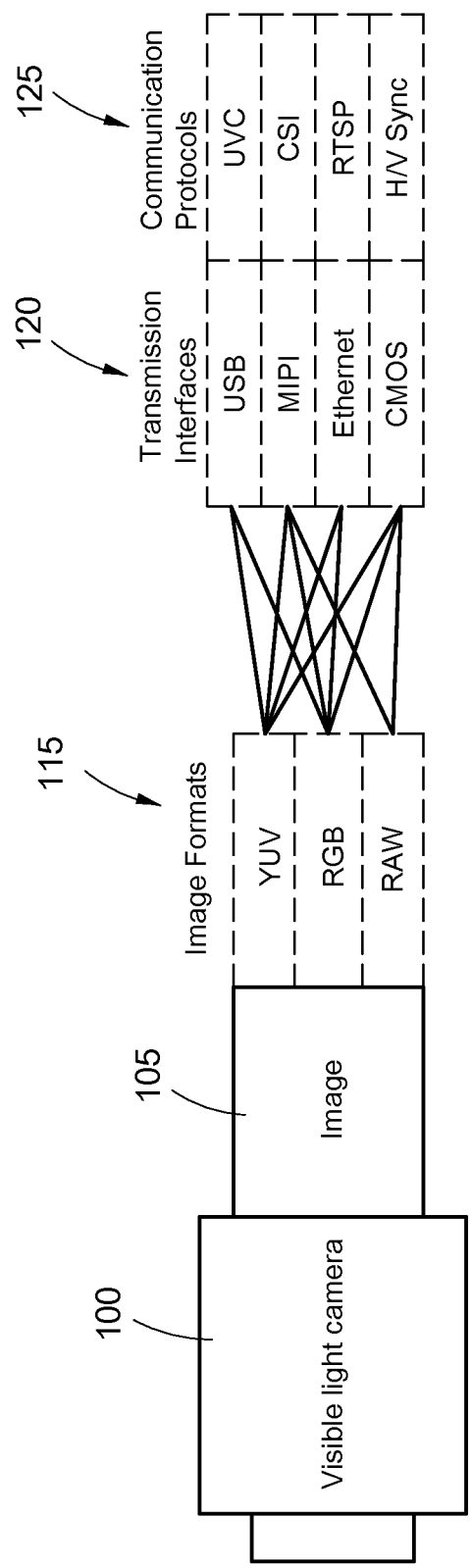
FIG. 1 is a schematic diagram illustrating data formats of images captured by a visible light camera, transmission interfaces for the data formats, and communication protocols corresponding to the transmission interfaces.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 is a schematic diagram illustrating data formats of images captured by a visible light camera, transmission interfaces for the data formats, and communication protocols corresponding to the transmission interfaces. The visible light camera 100 senses the visible light and generates an image 105. The image 105 is a visible light image. The visible light image is the standardized image, and an image format of the standardized image includes, but not limited to, the YUV (Luma, Chrominance, and Chroma) format, the RGB image channel format, the raw data format, and the like.

The visible light camera 100 includes multiple transmission interfaces 120 and transmits the image 105 through one of the transmission interfaces 120 with corresponding communication protocol 125. For example, the multiple transmission interfaces 120 include, but not limited to, the USB (Universal Serial Bus), the MIPI (Mobile Industry Processor Interface), the Ethernet, the CMOS (Complementary Metal-Oxide-Semiconductor), and the like.

The image 105 may be the visible light image and use the standardized image format. The visible light camera 100 may transmit the image 105 which is the standardized image through one of the transmission interfaces 120 and the communication protocols 125 with the industrial standard to a receiver (not shown in FIGURES). In FIG. 1, a link between the image format 115 and the transmission interface 120 represents the compatibility of the image format 115 with the transmission interface 120. For example, the visible light camera 100 may transmit the image 105 whose image format 115 is the YUV format through the transmission interface 120 of the USB, the MIPI, the Ethernet, or the CMOS. Although both the image format 115 and the transmission interface 120 of the visible light camera 100 are standardization subjects, the data format of an invisible light image is not regulated by any standard. The image format 115 and the transmission interface 120 are regulated by the standards; however, image format 115 and the transmission interface 120 are not compatible of transmitting the data other than the visible light images. In the situation that the visible light camera 100 is replaced by an infrared sensor, aa receiver with a proprietary driver or a software development kit should be provided to process images generated by the infrared sensor.

Figure 2:
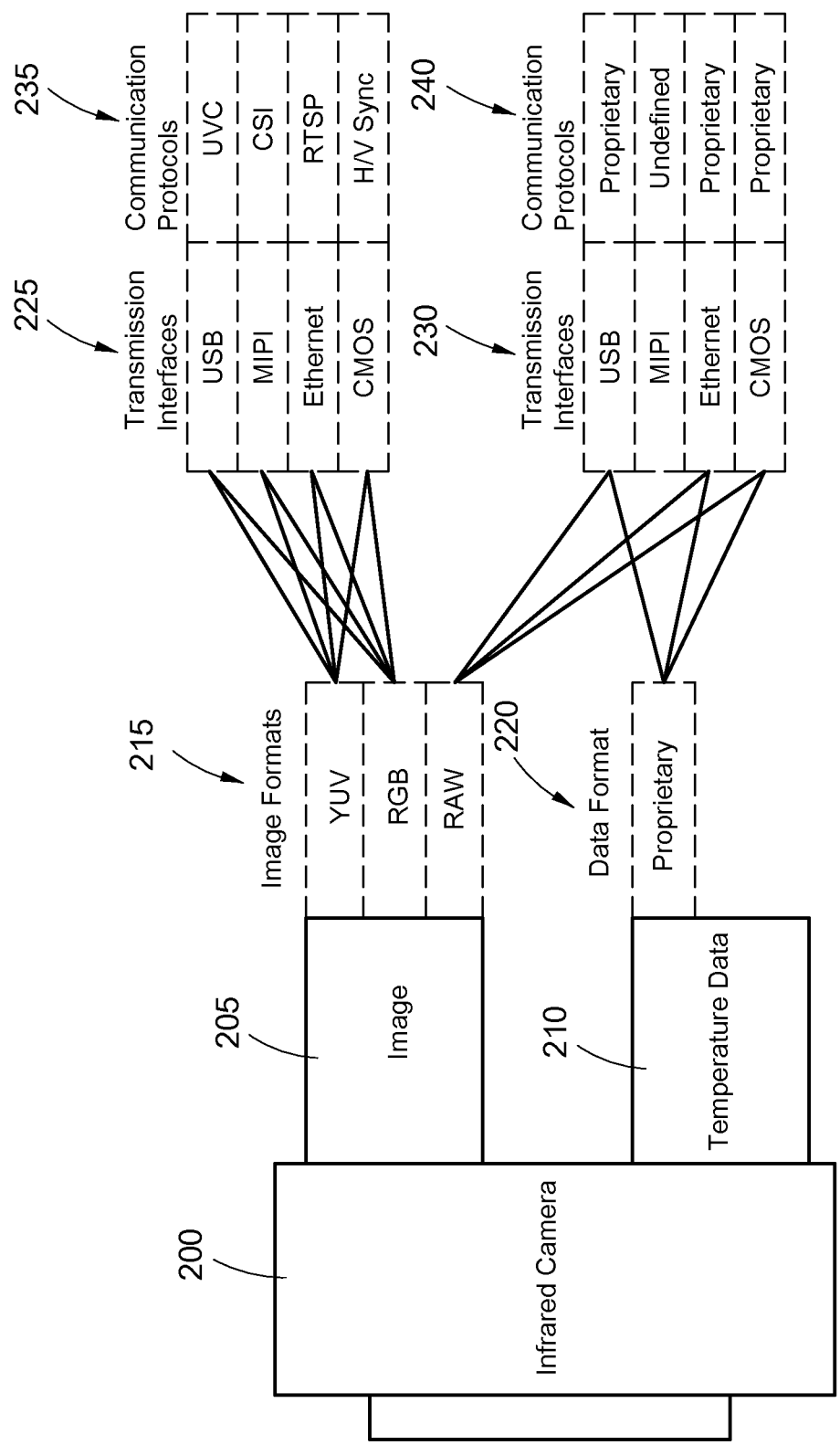
FIG. 2 is a schematic diagram illustrating sensing data generated by an infrared camera, and the transmission interface and the communication protocols are compatible with the data format.

Reference is made to FIG. 2. FIG. 2 is a schematic diagram illustrating sensing data generated by an infrared camera, and the transmission interfaces and the communication protocols compatible with the data format. The infrared camera 200 may sense the infrared light and generate the sensing data. The infrared camera 200 may be the infrared thermal camera. The sensing data includes an image 205 and a temperature data 210. Because the sensing data of the infrared thermal camera is not generated in a standardized data format, even if an image format 215 of the image 205 may be processed into the YUV format, the RGB image channel format, or the raw data format, a data format 220 of the temperature data 210 is not standardized (i.e., with proprietary property). As a consequence, the data format 220 lacks consistency among different developers because the camera developers have no standards to follow and can just design their proprietary formats.

In addition, as described above, the link between the image formats 215 and the transmission interfaces 225 represents the compatibility of the image formats 215 with the transmission interfaces 225, and the link between the data format 220 and the transmission interfaces 230 represents the compatibility of the data format 220 with the transmission interfaces 230.

In general, the infrared camera 200 respectively transmits the image 205 and the temperature data 210 through the transmission interfaces 225 and 230. In other words, the infrared camera 200 should be configured with two or more interfaces of the transmission interfaces 225 and 230 to respectively transmit the image 205 and the temperature data 210, so the receiver should be configured with two or more receiving interfaces as well to receive the image 205 and the temperature data 210. As described above, the data format 220 of the temperature data 210 is designed by the developer of the infrared camera 200, so the communication protocol 240 applied by the transmission interface 230 is designed by the developer as well. Therefore, another problem of increasing development complexity is raised correspondingly.

It should be noted that both of the terms "invisible light image" and "infrared image" indicate the image including the temperature information and can be used interchangeably in the disclosure. The temperature data 210 is the data of the temperature information described by numbers or texts. For example, the color presented in the invisible light image represents the temperature. Temperature values and colors (pixel value) corresponding to the temperatures are stored in a lookup table in advance, so the color distribution presented in the invisible light image may be shown in a more intuitional way.

In the disclosure, one byte is equal to 8 bits, and the two terms "one byte" and "8 bits" may be used interchangeably without ambiguity in meanings.

Figure 3:
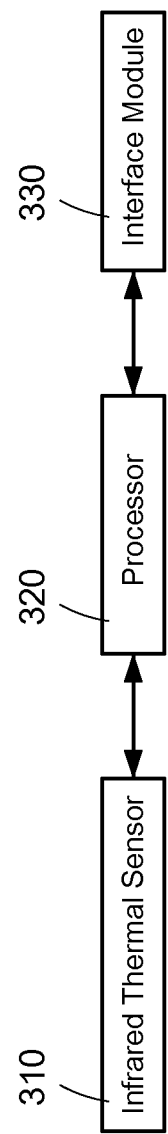
FIG. 3 is a block diagram illustrating a camera according to an embodiment of the present disclosure.

Reference is made to FIG. 3. FIG. 3 is a block diagram illustrating a camera according to an embodiment of the present disclosure. The camera 300 includes an infrared thermal sensor 310, a processor 320, and an interface module 330. The processor 320 is connected to the infrared thermal sensor 310 and the interface module 330.

The infrared thermal sensor 310 is configured to sense the infrared radiation energy and transform the sensed infrared radiation energy into electronic power to generate original sensing data presenting actual environmental temperatures. The original sensing data is presented in the image format, and different colors of the image indicate the temperature distribution. In one example, the original sensing image is digital data with 14 bits.

The processor 320 is configured to process the original sensing data to generate the invisible light image and multiple temperature data. In one embodiment, a pixel data size of the invisible light image is one byte (8 bits), and a unit data size of the temperature data is two bytes (16 bits).

In one embodiment, the pixel data size indicates the data size of one pixel. For example, the pixel data size is 3 bytes (24 bits), and it indicates that the data size of one pixel is 3 bytes.

In one embodiment, the unit data size of the temperature data indicates the data size of one temperature data. For example, the unit data size is 16 bytes, and it indicates that the data size of one temperature data is 16 bytes.

The processor 320 may be, but not limited to, a Digital Signal Processor (DSP), an Application Specific Integrated Circuit (ASIC), a Central Processing Unit (CPU), a System on Chip (SoC), a Field Programmable Gate Array (FPGA), a Network Processor IC, or the combination of the components above.

The interface module 330 includes multiple transmission interfaces. The interface module 330 is configured to transmit the heterogeneous data including the image and the temperature data described above through one of the multiple transmission interfaces. In one embodiment, each transmission interface of the interface module 330 supports the transmission of the image of the YUV format and the RGB image channel format.

The transmission interfaces of the interface module 330 may be, but not limited to, the USB (Universal Serial Bus), the MIPI (Mobile Industry Processor Interface), the Ethernet interface, the interface applied by the CMOS (Complementary Metal-Oxide-Semiconductor) sensor, or the combination of the components above.

Figure 4:
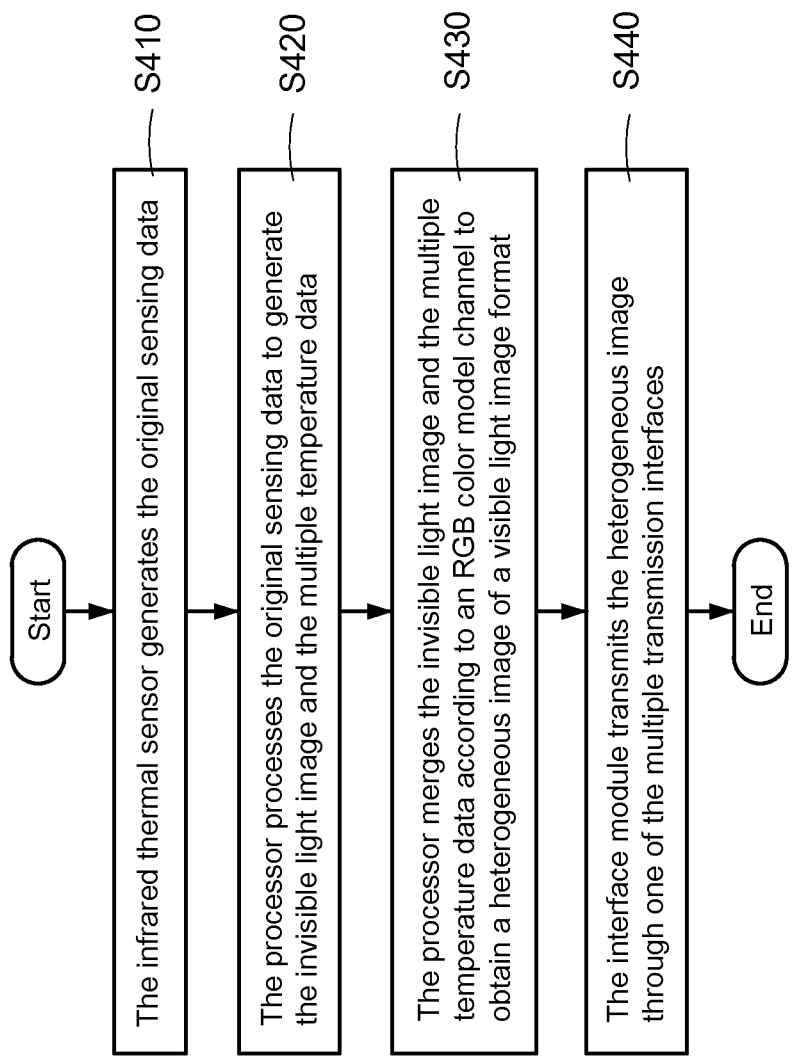
FIG. 4 is a flowchart illustrating an image transmission method for the camera according to an embodiment of the present disclosure.

Reference is made to FIG. 4. FIG. 4 is a flowchart illustrating an image transmission method for the camera according to an embodiment of the present disclosure.

The image transmission method is performed by the camera 300 of FIG. 3.

In step S410, the infrared thermal sensor 310 generates the original sensing data.

In step S420, the processor 320 processes the original sensing data to generate the invisible light image and the multiple temperature data.

In step S430, the processor 320 merges the invisible light image and the multiple temperature data according to an RGB color model channel to obtain a heterogeneous image of a visible light image format.

In step S440, the interface module 330 transmits the heterogeneous image through one of the multiple transmission interfaces.

Further description of steps S410 to S440 is provided below.

In step S410, every pixel of a sensing element of the infrared thermal sensor 310 senses the infrared thermal energy and transforms the infrared thermal energy into the temperature data. Every pixel corresponds to one temperature data, and a value of each temperature data is assigned one corresponding color in advance. The temperature distribution of the original sensing data generated by the infrared thermal sensor 310 is stored by the corresponding color, so the temperature data may be presented in the image format. The original sensing data is the raw data generated by the infrared thermal sensor 310.

Figure 5:
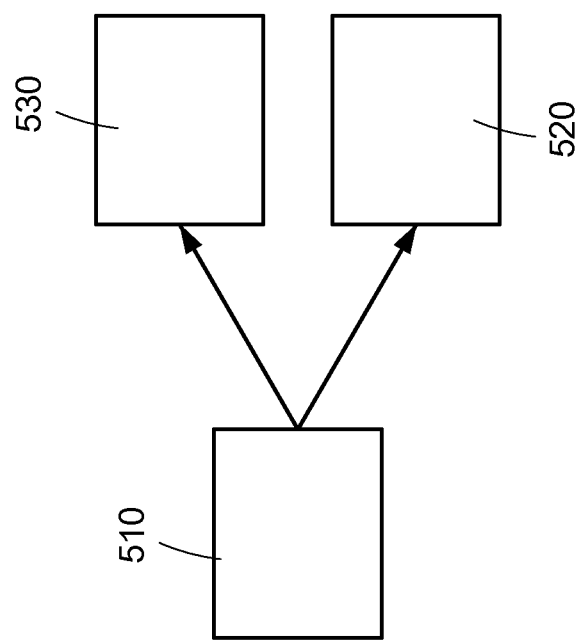
FIG. 5 is a schematic diagram of analyzing an original sensing data according to an embodiment of the present disclosure.

The description of step S420 is provided by incorporating FIG. 5. FIG. 5 is a schematic diagram of analyzing the original sensing data according to an embodiment of the present disclosure. The processor 320 obtains the temperature data 520 by analyzing the sensing voltage of the original sensing data 510 and transforms the original sensing data 510 into the invisible light image 530 by performing an algorithm. In one embodiment, the original sensing data 510 is the image whose pixel data size is 14 bits, the temperature data 520 is the data whose unit data size is 2 bytes, and the invisible light image 530 is the image whose pixel data size is one byte.

To reduce the quantity of the transmission interfaces of the interface module 330 being used to transmit the data, in step S430 the processor 320 merges the invisible light image 530 and the temperature data 520 according to the RGB color model channel that is generally used to transmit visible light images.

In one embodiment, the RGB color model channel includes a red color channel, a green color channel, and a blue color channel. Channel sizes of the red color channel, the green color channel, and the blue color channel may be the same or different among others, and the total channel size of the red color channel, the green color channel, and the blue color channel is equal to the data size of one pixel of the image. For example, when the sizes of the red color channel, the green color channel, and the blue color channel of one image are 1 byte respectively (i.e., the total channel size is 3 bytes), the data size of one pixel of the color image is 3 bytes; when the sizes of the red color channel, the green color channel, and the blue color channel of one image are 2 bytes respectively (i.e., the total channel size is 6 bytes), the data size of one pixel of the color image is 6 bytes; when the sizes of the red color channel, the green color channel, and the blue color channel of one image are 5 bits, 6 bits, and 5 bits respectively (i.e., the total channel size is 16 bits), the data size of one pixel of the color image is 16 bits. To simplify the explanation, the following description takes 3 bytes as one example of the data size of one pixel of the color image (i.e., each channel size of the red color channel, the green color channel, and the blue color channel is 8 bits respectively).

Figure 6:
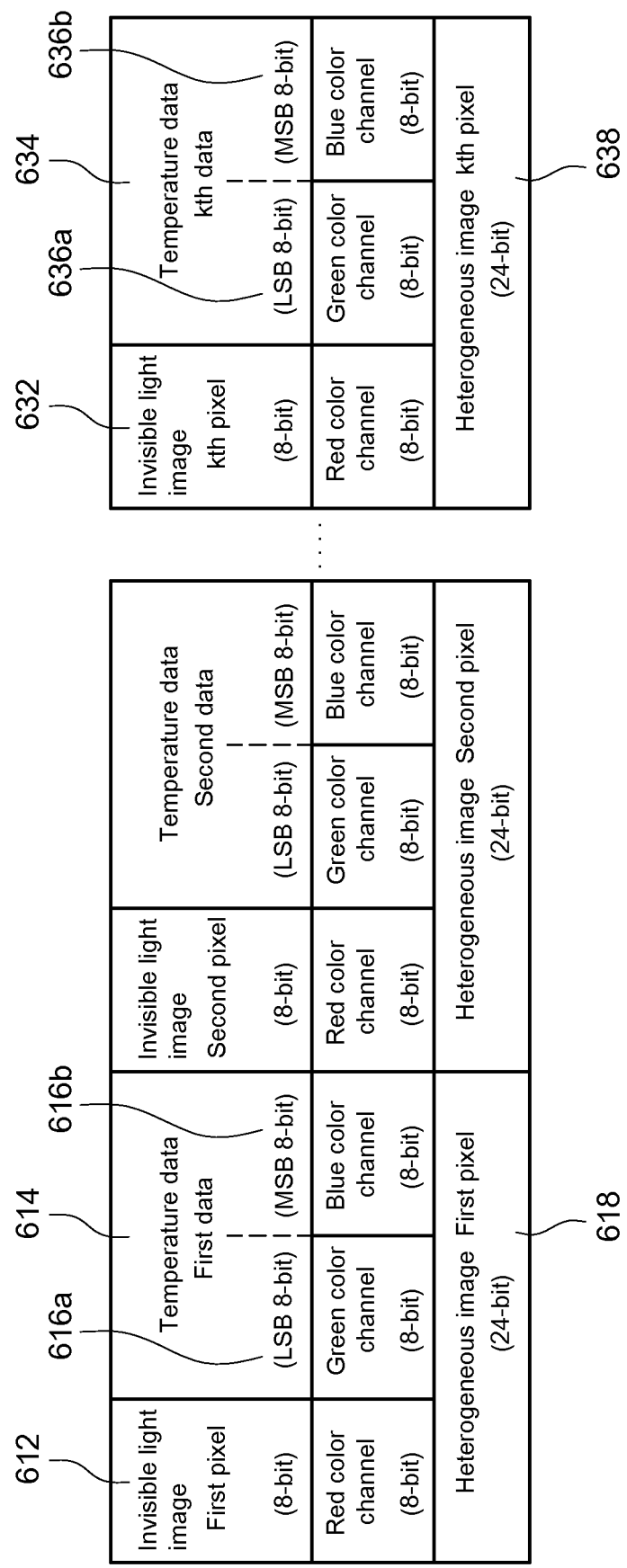
FIG. 6 illustrates an example of merging an invisible light image and a temperature data according to an embodiment of the present disclosure.

Reference is made to FIG. 6. FIG. 6 illustrates an example of merging the invisible light image and the temperature data according to an embodiment of the present disclosure.

In one embodiment, the invisible light image includes multiple pixels and each pixel corresponds to one temperature data. In one embodiment, the quantity of the pixels of the invisible light image is equal to the quantity of the temperature data, and the multiple pixels of the invisible light image correspond to the multiple temperature data one-by-one.

In one embodiment, the pixel data size of each pixel of the invisible light image is one byte.

In one embodiment, two bytes of the temperature data may be divided into multiple parts. For example, the two bytes of the temperature data include a first part and a second part, and the data size of each of the first part and the second part may be greater than or equal to 0. For example, the first part is 1 byte and the second part is 1 byte. In the other example, the first part is 2 bytes and the second part is 0 byte.

In one embodiment, the total size of the first part and the second part is equal to the unit data size of the temperature data. For example, the total size of the first part and the second part is 2 bytes (16 bits), where the first part and the second part are one byte respectively, or the first part is 6 bits and the second part is 10 bits.

When the process of merging the invisible light image and the temperature data is performed, the bit-value of the first part and the bit-value of the second part may be merged in the form of a linear combination to be one part of the heterogeneous image. For example, as shown in FIG. 6, 8 bits of the LSB (least significant byte) 616a is the first part of the temperature data and 8 bits of the MSB (most significant byte) 616b is the second part of the temperature data. In the embodiment, the bit-value of the first part and the bit-value of the second part form the linear combination and the combination result includes bytes from the least significant byte to the most significant byte.

In one embodiment, if the resolution of the invisible light image is 80×60 (pixel), there are 4800 pixels of the invisible light image and 4800 data quantity of the temperature data. Each pixel of the image data is 8 bits (one byte), and the unit data size of the temperature data is 16 bits (2 bytes).

Taking a kth pixel of the multiple pixels of the invisible light image as an example, the processor 320 merges the kth pixel of the invisible light image and the temperature data corresponding to the kth pixel according to the RGB color model channel, and the merged data is stored in the kth pixel of the heterogeneous image.

In one embodiment, the pixel data size of the merged data, i.e., the data stored in the kth pixel of the heterogeneous image, is 3 bytes. In the embodiment, the data of each pixel of the heterogeneous image is the linear combination of the bit-value of the image data of one pixel of the invisible light image and the bit-value of one temperature data. For example, the bit-value of one temperature data is 11011011 00100100, where the bit-value of the first part of the temperature data is 11011011 and the bit-value of the second part of the temperature data is 00100100. In the meantime, the bit-value of one pixel of the invisible light image is 00001111. The data mentioned above are merged into one pixel data of the heterogeneous image, and the bit-value of the obtained one pixel of the heterogeneous image is 00001111 11011011 00100100. The mergence process is "the bit-value of one pixel of the invisible light image, the bit-value of the first part of the temperature data, and the bit-value of the second part of the temperature data" that the bit-value of each one byte is combined according to the order from the least significant byte to the most significant byte.

Following the above example, because the data of each pixel of the heterogeneous image contains the linear combination of the bit-value of the image data of one pixel of the invisible light image and the bit-value of one temperature data, the bit-value of the image data of the pixel of the heterogeneous image may also be 00001111 00100100 11011011. The mergence process of this embodiment is "the bit-value of one pixel of the invisible light image, the bit-value of the second part of the temperature data, the bit-value of the first part of the temperature data" that the bit-value of each one byte is combined according to the order from the least significant byte to the most significant byte.

In the other embodiment, the bit-value of the image data of the pixel of the heterogeneous image may be 00100100 00001111 11011011 as well. The mergence process of this embodiment is "the bit-value of the second part of the temperature data, the bit-value of one pixel of the invisible light image, and the bit-value of the first part of the temperature data" that the bit-value of each one byte is combined according to the order from the least significant byte to the most significant byte.

It should be noted that the mergence processes above are provided as some examples, and other possible combination patterns that may be inferred from the description may be applied in the disclosure.

In one embodiment, the RGB color model channel includes the red color channel, the green color channel, and the blue color channel, and each color channel has a color channel byte size. The size of the RGB color model channel is the total size of all the color channel byte sizes. For example, the color channel byte sizes of the red color channel, the green color channel, and the blue color channel are 8 bits respectively, so the size of the RGB color model channel is 24 bits.

In one embodiment, the processor 320 arranges one pixel of the invisible light image in one channel of the RGB color model channel and arranges one temperature data corresponding to one pixel of the invisible light image in the other two channels of the RGB color model channel to perform the mergence process, to obtain one pixel of the heterogeneous image.

As shown in FIG. 6, in one embodiment, a first pixel 612 of the invisible light image is arranged at the red color channel, one byte data of the least significant byte (LSB) 616a of a first data 614 of the multiple temperature data is arranged at the green color channel, and one byte data of the most significant byte (MSB) 616b of the first data 614 of the multiple temperature data is arranged at the blue color channel. Based on the arrangement, the first pixel 612 of the invisible light image and the first data 614 of the multiple temperature data are merged into the data of the first pixel of the heterogeneous image, that is, the merged data is stored at the position of the first pixel 618 of the heterogeneous image. In the same way, the kth pixel 632 of the invisible light image is arranged at the red color channel, one byte data of the LSB 636a of the kth data 634 of the multiple temperature data is arranged at the green color channel, and one byte data of the MSB 636b of the kth data 634 of the multiple temperature data is arranged at the blue color channel. Based on the arrangement, the kth pixel 632 of the invisible light image and the kth data 634 of the multiple temperature data are merged into the data of the kth pixel of the heterogeneous image, that is, the merged data is stored at the position of the kth pixel 638 of the heterogeneous image, where k is a positive integer from 1 to the resolution of the heterogeneous image. For example, if the resolution of the heterogeneous image is 80×60 (pixels), the k is the positive integer within the range 1≤k≤4800.

In one embodiment, the processor 320 performs the process of merging the invisible light image and the temperature data of FIG. 6, and merges all pixels of the invisible light image and the temperature data corresponding to the invisible light image to obtain an entire heterogeneous image. In the embodiment, the pixel data size of each pixel of the heterogeneous image is 3 bytes.

In one embodiment, the image data size of one pixel (one byte) of the invisible light image is equal to the color channel byte size, and the data size of one temperature data (two bytes) is twice the color channel byte size. For example, the color channel byte size is 8 bits, the image data size of one pixel of the invisible light image is 8 bits, and the data size of one temperature data is 16 bits.

In the other embodiment, the processor 320 merges the invisible light image, the multiple temperature data, and the original sensing data according to the RGB color model channel to generate the heterogeneous image. The mergence process is similar to that disclosed in FIG. 6, and the difference between the mergence process of this embodiment and the mergence process of the embodiment of FIG. 6 is that the processor 320 in this embodiment additionally merges the original sensing data into one part of the RGB color model channel to obtain the heterogeneous image. In other words, the data quantity to be merged is not limited in the disclosure. As long as the total size of the data that is merged to generate the heterogeneous image is less than or equal to the total channel size of the RGB color model channel, the data is capable of being applied in the disclosure.

Figure 7:
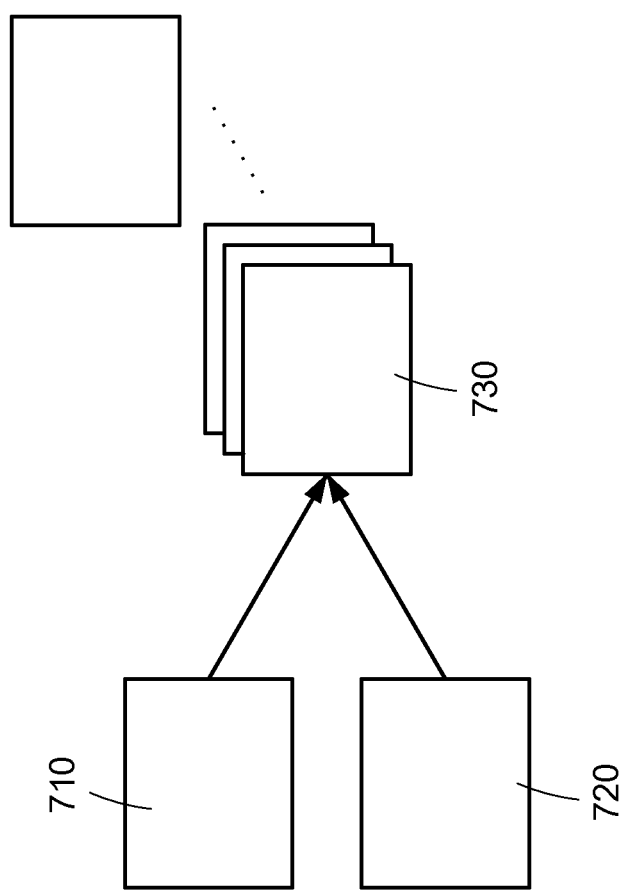
FIG. 7 is an illustration of a heterogeneous image including a visible light image format obtained by merging the invisible light image and the temperature data according to an embodiment of the present disclosure.

Reference is made to FIG. 7. FIG. 7 is an illustration of the heterogeneous image including the visible light image format obtained by merging the invisible light image and the temperature data according to an embodiment of the present disclosure. The processor 320 of the camera 300 performs the mergence process of FIG. 6 to each pixel of the invisible light image 710 and the temperature data 720 corresponding to each pixel position and obtains the pixel data of the visible light image format at the corresponding pixel position. The processor 320 merges all the pixels of the invisible light image 710 and the temperature data 720 corresponding to all the pixel positions to obtain the entire heterogeneous image 730.

In one embodiment, the visible light image format includes, but not limited to, the YUV format and the RGB format.

Because the camera 300 continuously captures the original sensing data (such as a capturing frequency of 30 fps (frames per second)), every original sensing data is processed by the processor 320 and the corresponding invisible light image 710 and the corresponding multiple temperature data 720 are generated. Therefore, multiple heterogeneous images 730 are generated correspondingly.

It should be noted that the permutation pattern (or called "combination pattern") that the processor 320 merges the pixel of the invisible light image and the temperature data is not limited to the pattern described in FIG. 6.

Reference is made back to FIG. 6. In the other embodiment, the processor 320 merges the multiple pixels and the multiple temperature data by a predefined permutation. For example, the predefined permutation includes arranging the first pixel 612 (one byte) and the first data 614 (two bytes) interleaved to the red color channel (one byte), the green color channel (one byte), and the blue color channel (one byte) in turn (FIG. 6 is not shown). Therefore, the data of the multiple bytes of each pixel of the heterogeneous image is stored to the pixel in the permutation order (all the bytes of each pixel of the invisible light image are interleaved with all the bytes of each temperature data by using the permutation, such that each temperature data is encoded into the heterogeneous image in the discontinuous pattern); the LSB 616a of the first data 614 of the temperature data is arranged at the red color channel, the MSB 616b is arranged at the green color channel, and the first pixel 612 of the invisible light image is arranged at the blue color channel (FIG. 6 is not shown). Other permutations may be provided similarly, and the permutation pattern for the mergence process is not limited.

Figure 8:
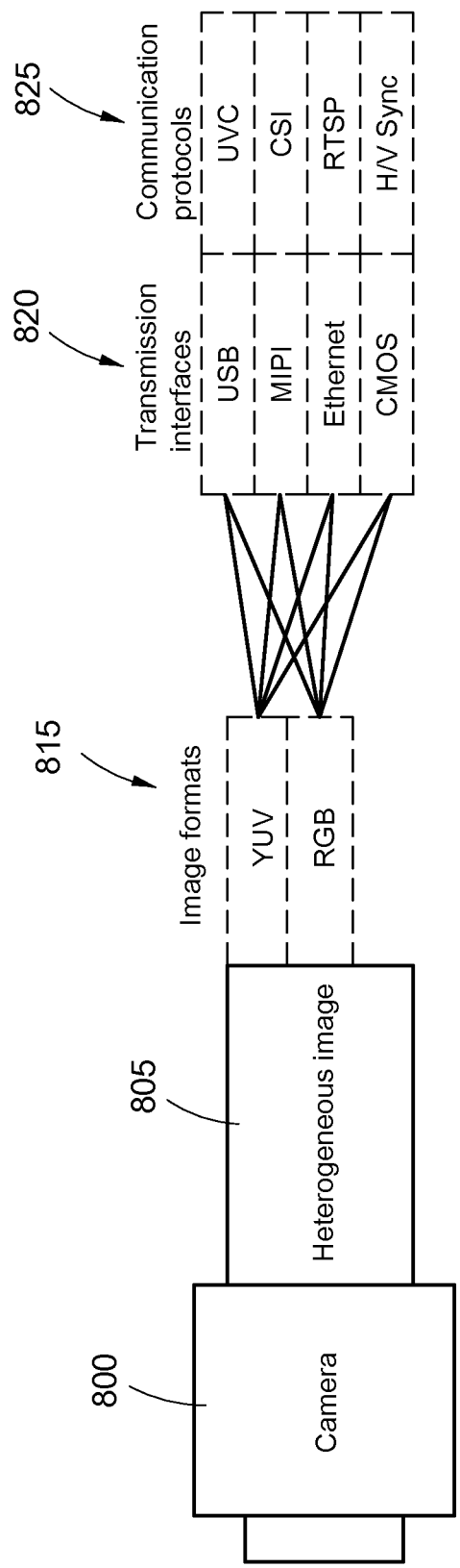
FIG. 8 is a schematic diagram illustrating images and temperature data generated by the camera and the transmission interface applied by the camera according to an embodiment of the present disclosure.

Reference is made to FIG. 8. FIG. 8 is a schematic diagram illustrating the images and the temperature data generated by the camera and the transmission interface applied by the camera according to an embodiment of the present disclosure. The camera 800 performs steps of the image transmission method described in FIG. 4. More particularly, the camera 800 merges the invisible light image and the temperature data to generate the heterogeneous image 805. The image format 815 of the heterogeneous image 805 may be, but not limited to, the YUV format or the RGB format.

Because the invisible light image and the temperature data are not compatible with the standardized format and may be disguised as the visible light image which is regarded as the heterogeneous image 805 of the standard format by the process mentioned above, the camera 800 may transmit the heterogeneous image 805 of the standardized format by the transmission interface 820 with the industrial standard and the communication protocol 825 to the receiver (not shown in the figure).

It should be noted that the processor 320 performs the mergence process by using the RGB color model channel to obtain the heterogeneous image 805, and the image of the heterogeneous image 805 does not contain human-readable meanings to human. In one embodiment, the camera 300 applies the standardized image format to carry the data of two different types (i.e., the invisible light image and the temperature data) and merges the invisible light image and the temperature data by using the mergence process to disguise the invisible light image and the temperature data as the visible light image. Therefore, the complexity of the development process of transmitting the non-standardized data of the different types is reduced.

On the other hand, the receiver stores the permutation patterns of the mergence process in advance. More specifically, after receiving the heterogeneous image, the receiver retrieves the data of each byte of each pixel of the heterogeneous image 805 according to the permutation pattern and reversely reads the data to assemble the data to reconstruct the invisible light image and the temperature data, so one image frame is transmitted and recovered. For example, when the permutation pattern (such as the patterns mentioned above) is "the bit-value of the second part of the temperature data, the bit-value of one pixel of the invisible light image, and the bit-value of the first part of the temperature data", the receiver receives every byte of the pixel by the permutation pattern and assembles one pixel of the invisible light image and one temperature data like the one pixel and the one temperature before the mergence process. The receiver repeatedly performs the reconstruction process above to obtain one entire invisible light image and the temperature data corresponding to the invisible light image.

Accordingly, the camera and the image transmission method of the disclosure apply one transmission interface, without two or more transmission interfaces to respectively transmit the invisible light image and the corresponding data of the camera, to transmit the data and the images with two or more types. The camera and the image transmission method are compatible with the transmission of all the data formats and the images of all the image formats, so the user saves time in developing the proprietary driver or the software development kit, to implement the transmission of the image and the data of the non-standardized format by using the standardized image format to the receiver. Therefore, the development complexity is significantly reduced and operating costs are saved. In addition, the camera and the image transmission method do not compress the images, so the image information is retained, and the distortion problems can be avoided.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A camera, comprising:
an infrared thermal sensor, configured to generate an original sensing data;
a processor, connected to the infrared thermal sensor and configured to process the original sensing data to generate an invisible light image whose pixel data size is one byte and multiple temperature data whose unit data size is two bytes; and
an interface module, connected to the processor, comprising multiple transmission interfaces and configured to transmit a heterogeneous image whose pixel data size is three bytes through one of the multiple transmission interfaces, wherein a bit-value of the three bytes is a linear combination of a bit-value of the one byte of the invisible light image and a bit-value of the two bytes of the temperature data;
wherein the processor is configured to merge the invisible light image and the multiple temperature data according to an RGB color model channel to obtain the heterogeneous image of a visible light image format.

2. The camera of claim 1, wherein the invisible light image comprises multiple pixels, and the multiple temperature data respectively correspond to the multiple pixels, wherein the processor is configured to merge a kth pixel of the invisible light image and the temperature data corresponding to the kth pixel into a kth pixel of the heterogeneous image, wherein the pixel data size of each pixel of the heterogeneous image is three bytes, and k is a positive integer that is less than or equal to a resolution of the heterogeneous image.

3. The camera of claim 1, wherein the processor is configured to arrange one pixel of the invisible light image at one channel position of the RGB color model channel and arrange the temperature data corresponding to the one pixel of the invisible light image at another two channel positions of the RGB color model channel to merge the one pixel of the invisible light image and the temperature data to obtain the one pixel of the heterogeneous image.

4. The camera of claim 1, wherein the RGB color model channel comprises a red color channel, a green color channel, and a blue color channel, and each of the red color channel, the green color channel, and the blue color channel comprises a color channel byte size;
wherein the pixel data size of the invisible light image is equal to the color channel byte size, and the unit data size of the temperature data is twice the color channel byte size.

5. The camera of claim 1, wherein the two bytes of the temperature data comprise a first part and a second part, and the processor is configured to compute the linear combination of a bit-value of the first part and a bit-value of the second part of the temperature data to be one part of the three bytes of the heterogeneous image.

6. An image transmission method for a camera, wherein the camera comprises an infrared thermal sensor, a processor, and an interface module, the processor is connected to the infrared thermal sensor and the interface module, the image transmission method comprises:

generating an original sensing data by the infrared thermal sensor;

processing the original sensing data by the processor to generate an invisible light image whose pixel data size is one byte and multiple temperature data whose unit data size is two bytes;

merging, by the processor, the invisible light image and the multiple temperature data according to an RGB color model channel to obtain a heterogeneous image of a visible light format whose pixel data size is three bytes, wherein a bit-value of the three bytes is a linear combination of a bit-value of the one byte and a bit-value of the two bytes; and transmitting the heterogeneous image through one of multiple transmission interfaces of the interface module.

7. The image transmission method of claim 6, wherein the invisible light image comprises multiple pixels, and the multiple temperature data respectively correspond to the multiple pixels, wherein step of merging the invisible light image and the multiple temperature data to obtain the heterogeneous image comprises:

merging a kth pixel of the invisible light image and the temperature data corresponding to the kth pixel into a kth pixel of the heterogeneous image, wherein the pixel data size of each pixel of the heterogeneous image is three bytes, and k is a positive integer that is less than or equal to a resolution of the heterogeneous image.

8. The image transmission method of claim 6, wherein step of merging the invisible light image and the multiple temperature data to obtain the heterogeneous image comprises:

arranging one pixel of the invisible light image at one channel position of the RGB color model channel and arranging the temperature data corresponding to the one pixel of the invisible light image at another two channel positions of the RGB color model channel to merge the one pixel of the invisible light image and the temperature data to obtain the one pixel of the heterogeneous image.

9. The image transmission method of claim 6, wherein the RGB color model channel comprises a red color channel, a green color channel, and a blue color channel, and each of the red color channel, the green color channel, and the blue color channel comprises a color channel byte size; wherein the pixel data size of the invisible light image is equal to the color channel byte size, and the unit data size of the temperature data is twice the color channel byte size.

10. The image transmission method of claim 6, wherein the two bytes of the temperature data comprise a first part and a second part, and step of merging the invisible light image and the multiple temperature data to obtain the heterogeneous image further comprises:

computing the linear combination of a bit-value of the first part of the temperature data and a bit-value of the second part of the temperature data to be one part of the three bytes of the heterogeneous image.

\* \* \* \* \*